(12) United States Patent
Abboud

(10) Patent No.: US 8,803,678 B2
(45) Date of Patent: Aug. 12, 2014

(54) VEHICLE RANGE PROJECTION FOR MULTIPLE DRIVERS OF A SHARED VEHICLE

(71) Applicant: GM Global Technology Operations LLC, Detroit, MI (US)

(72) Inventor: Eugenie Abboud, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/686,142

(22) Filed: Nov. 27, 2012

(65) Prior Publication Data
US 2014/0145841 A1    May 29, 2014

(51) Int. Cl.
*B60Q 1/00*    (2006.01)
*G01C 21/00*    (2006.01)

(52) U.S. Cl.
USPC ............................ 340/439; 340/438; 701/409

(58) Field of Classification Search
USPC ............. 340/426.13, 426.16, 426.17, 426.36, 340/438, 439, 576; 701/1, 409; 726/28
See application file for complete search history.

(56) References Cited

U.S. PATENT DOCUMENTS

| | | | |
|---|---|---|---|
| 6,526,335 B1* | 2/2003 | Treyz et al. | 701/1 |
| 6,711,474 B1* | 3/2004 | Treyz et al. | 701/1 |
| 7,530,113 B2* | 5/2009 | Braun | 726/28 |
| 8,581,711 B2* | 11/2013 | Morgan et al. | 340/426.11 |
| 2012/0253655 A1* | 10/2012 | Yamada et al. | 701/409 |

* cited by examiner

*Primary Examiner* — Van T. Trieu
(74) *Attorney, Agent, or Firm* — Cantor Colburn LLP

(57) ABSTRACT

Vehicle range projection includes detecting, via a vehicle antenna, a key fob within range of the vehicle. The key fob is associated with an individual. The vehicle range projection also includes searching, via a computer processor embedded in the vehicle, a database for a record having an identifier that matches an identifier of the key fob. The record stores historical drive cycle data associated with the key fob and the individual. The vehicle range projection further includes retrieving the historical drive cycle data and calculating a projected electric range value indicative of a distance in which the vehicle is capable of traveling on electric-only power. The projected electric range value is calculated as a function of a distance calculated based on available battery charge that is adjusted based on a driving style of the individual. The driving style of the individual is determined from the historical drive cycle data.

20 Claims, 4 Drawing Sheets

VEHICLE RANGE PROJECTION FOR MULTIPLE DRIVERS OF A SHARED VEHICLE

FIELD OF THE INVENTION

The subject invention relates to electric vehicle range projection and, more particularly, to vehicle range projection for multiple drivers of a shared vehicle.

BACKGROUND

Many vehicles offer various vehicle data, e.g., on an instrument panel, center stack console, or infotainment system display. Some of the data provided by the vehicle relate to current vehicle speed, remaining amount of fuel, and an average number of miles the driver can travel on a full tank of gas. For electric vehicles, knowing how far a driver can travel based on an existing level of battery charge is especially important, as recharging stations for these types of vehicles are not as abundant or accessible as service stations that sell fuel.

Determining how far a driver can travel on an existing level of battery charge or amount of remaining fuel can vary based on the driving style of the vehicle operator, as well as other factors, such as climate and terrain. For example, an operator who aggressively accelerates and decelerates may consume more power than an operator of the same vehicle who drives at a more consistent speed. In another example, extreme climates and varying terrain can affect energy consumption. Thus, for two identical vehicles having the same amount of fuel or battery charge, the actual distance the vehicle is capable of traveling can be very different for different drivers and at different times and/or locations.

Accordingly, it is desirable to provide an accurate projected electric range for a vehicle shared by multiple drivers, such that each projected electric range value is customized for each of the drivers.

SUMMARY OF THE INVENTION

In one embodiment of the invention, a system is provided. The system includes a computer processor embedded in a vehicle, an antenna embedded in the vehicle, a data bus communicatively coupling the antenna to the computer processor, and logic executable by the computer processor. The logic is configured to implement a method. The method includes detecting, via the antenna, a key fob within range of the vehicle. The key fob is associated with an individual. The method also includes searching a database for a record having an identifier that matches an identifier of the key fob. The record stores historical drive cycle data associated with the key fob and the individual. The method further includes retrieving the historical drive cycle data and calculating a projected electric range value indicative of a distance in which the vehicle is capable of traveling on electric-only power. The projected electric range value is calculated as a function of a distance calculated based on available battery charge and is adjusted based on a driving style of the individual. The driving style of the individual is determined from the historical drive cycle data. The method also includes transmitting the projected electric range value over the data bus to a device in the vehicle, and presenting the projected electric range value via the device.

In another embodiment of the invention, a method is provided. The method includes detecting, via an antenna embedded in a vehicle, a key fob within range of the vehicle. The key fob is associated with an individual. The method also includes searching, via a computer processor embedded in the vehicle, a database for a record having an identifier that matches an identifier of the key fob. The record stores historical drive cycle data associated with the key fob and the individual. The method further includes retrieving the historical drive cycle data and calculating a projected electric range value indicative of a distance in which the vehicle is capable of traveling on electric-only power. The projected electric range value is calculated as a function of a distance calculated based on available battery charge and adjusted based on a driving style of the individual. The driving style of the individual is determined from the historical drive cycle data. The method also includes transmitting the projected electric range value over a data bus to a device in the vehicle, and presenting the projected electric range value via the device.

In a further embodiment of the invention, a computer program product is provided. The computer program product includes a computer readable storage medium having instructions embodied thereon, which when executed by a computer processor, cause the computer processor to implement a method. The method includes detecting, via an antenna embedded in a vehicle, a key fob within range of the vehicle. The key fob is associated with an individual. The method also includes searching, via a computer processor embedded in the vehicle, a database for a record having an identifier that matches an identifier of the key fob. The record stores historical drive cycle data associated with the key fob and the individual. The method further includes retrieving the historical drive cycle data and calculating a projected electric range value indicative of a distance in which the vehicle is capable of traveling on electric-only power. The projected electric range value is calculated as a function of a distance calculated based on available battery charge and adjusted based on a driving style of the individual. The driving style of the individual is determined from the historical drive cycle data. The method also includes transmitting the projected electric range value over a data bus to a device in the vehicle, and presenting the projected electric range value via the device.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
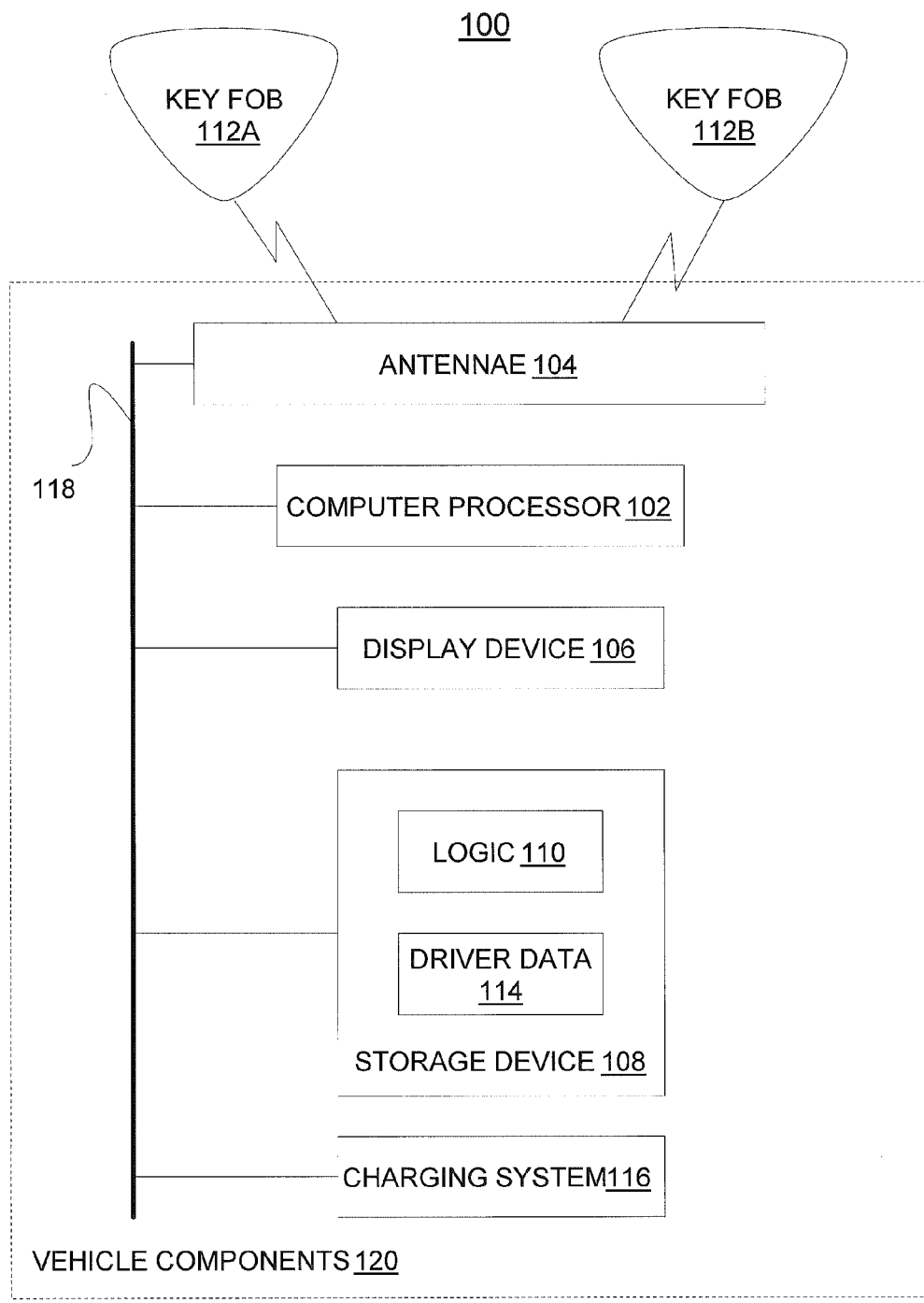
FIG. 1 is a system upon which electric vehicle range projection for multiple drivers of a shared vehicle may be implemented in accordance with an exemplary embodiment of the invention.

The following description is merely exemplary in nature and is not intended to limit the present disclosure, its application or uses. It should be understood that throughout the drawings, corresponding reference numerals indicate like or corresponding parts and features.

In accordance with an exemplary embodiment, electric vehicle range projection for multiple drivers of a shared vehicle (also referred to herein as "range projection") is provided. A key fob carried by a user is discovered when in range of the vehicle, and an identifier of the key fob is used to access a storage device in the vehicle's memory system to retrieve the driver data associated with that key fob and user. The range projection process applies calculations on the driver data and a current amount of available or remaining energy in a battery pack in the vehicle, as well as other factors, to determine a projected electric range value that is specific to this user and his/her driving style. In an embodiment, the range projection calculation may be repeated during a driving event and may be updated to reflect current vehicle usage. This projected electric range value can be particularly useful to drivers of electric vehicles who need to know how far they can travel before having to recharge their vehicles, since vehicle chargers may not be as accessible as service stations that provide gasoline or diesel fuel.

Turning now to FIG. 1, a system 100 upon which range projection processes may be implemented will now be described in an exemplary embodiment. The system 100 includes key fobs 112A and 112B and vehicle components 120. Each of the key fobs 112A and 112B is programmed to operate with an electric vehicle (e.g., a vehicle corresponding to the vehicle components 120) and each of the key fobs 112A and 112B is utilized by a respective individual, whereby the individuals share the use of the vehicle (e.g., as members of a family).

The vehicle may be any type of electric vehicle known in the art. The vehicle components 120 include a computer processor 102, one or more antennae 104, a display device 106, a storage device 108, and a charging system 116, each of which is communicatively coupled to a network communication bus 118 of the vehicle. The computer processor 102 may be implemented using a combination of hardware elements (e.g., circuitry, logic cores, registers, etc.), firmware, and software for processing data configured to control operation of the various components of the vehicle, as well as to facilitate the range projection processes described herein.

The antennae 104 and the key fobs 112A and 112B create a communication channel in response to the detection of one or both of the key fobs 112A and 112B in range of the vehicle. An authentication process is implemented (e.g., exchange of private key) to ensure the key fobs 112A and 112B are authorized to access the vehicle. The communication channel may be implemented using any short-range wireless communications protocols, such as Bluetooth® or Wi-Fi.

The display device 106 may be part of an infotainment system located in an instrument panel cluster or center stack of the vehicle. The display device 106 may include a liquid crystal display (LCD) or plasma monitor. The display device 106 communicatively couples with the bus 118 to receive and display instrumental panel data, such as current speed, average range or distance traveled in a drive cycle, and a current range projection value, to name a few. It will be understood that the vehicle (e.g., within the infotainment system) may include one or more speakers, amplifiers, and input/output (I/O) controls. In an embodiment, the electric range projection value may alternatively be presented in an audio format, e.g., through the speaker of an audio system or the infotainment system. As indicated above, the user may be identified by the corresponding key fob. In this embodiment, the system may be configured to address the user by name via the infotainment system (e.g., through the display device 106) or audio system.

The storage device 108 may be implemented using any types of memory storage, such as hard disk drive, removable storage, or similar devices. In an embodiment, the storage device 108 stores logic 110 and driver data 114. The logic 110 is configured to implement the exemplary range projection processes described herein. The driver data 114 includes historical data previously collected from vehicle devices, such as an accelerator and brakes, and a temperature sensor, as well as calculations derived for determining terrain. Driver data 114 may further include current vehicle speed, average speed, current and average rate of acceleration and deceleration, average range or distance traveled in a drive cycle, a current electric vehicle range projection value, and electrical energy consumption rate (i.e., energy usage). In one embodiment, terrain information may be calculated by determining accelerator positions as a function of speed. For example, in a hilly terrain, the driver increases pressure on the accelerator though the vehicle speed is not proportionately increased. In an embodiment, some of the driver data may be derived from navigation system information, such as traveled routes and terrain information gleaned from the traveled routes. In this embodiment, a global positioning system (GPS) device may be employed in the vehicle, and patterns of driving routes by an individual may be stored and used in the calculations.

The driver data 114 also includes a unique identifier that associates a particular key fob with an individual. For example, a parent may utilize key fob 112A while a teenage child may utilize key fob 112B when engaging in a driving event. The logic 110 stores the historical data and maps the historical data to the corresponding unique identifier, as will be described herein.

The charging system 116 may include electric vehicle supply equipment (e.g., a 120V or 220V SAE-compliant cord set), a vehicle charge port, a battery charger (e.g., an onboard charge module or OBCM), and a rechargeable battery. The OBCM may include one or more microprocessors and one or more high and low voltage chargers mounted in the vehicle. The battery may be a lithium-ion energy storage system connected to a charging circuit. The charging system 116 may communicate with the logic 110 to provide vehicle data (e.g., charging status and range projection) to the display device 106.

The bus 118 may be implemented as part of a vehicle network and may be wireline network, a wireless network, or a combination thereof. In an embodiment, the bus 118 is a serial data bus.

In operation, a key fob carried by a user is discovered when in range of the vehicle (via the antennae 104), and the identifier of the key fob is accessed in the storage device 108 by the logic 110 to retrieve the driver data associated with that key fob and user. The logic 110 applies calculations on the driver data and a current amount of available or remaining energy in the vehicle to determine a projected electric range that is specific to this user. In an embodiment, the range projection calculation may be repeated during a driving event and updated to reflect current vehicle usage.

Figure 2:
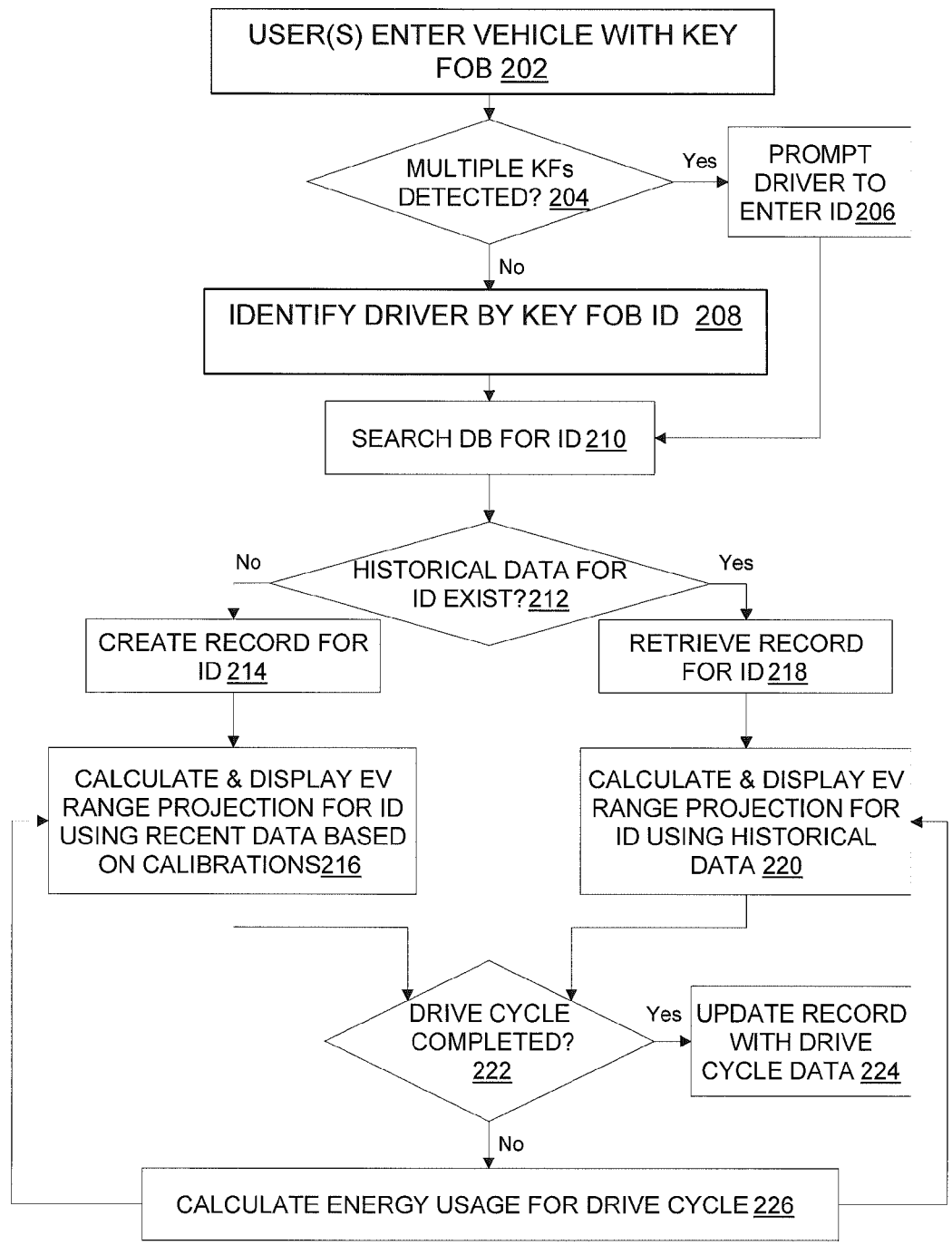
FIG. 2 is a flow diagram describing a process for implementing electric vehicle range projection for multiple drivers of a shared vehicle in accordance with an exemplary embodiment.

Turning now to FIG. 2, a flow diagram describing a process for implementing the range projection processes will now be described in an exemplary embodiment. At step 202, one or more users carrying a key fob (e.g., key fob 112A and/or key fob 112B) are detected by the vehicle via the antennae 104 by signals emitted between the key fob(s) and the vehicle's antennae 104. The antennae 104 communicate this detection to the computer processor 102 over the bus 118. The user(s) enter the interior cabin of the vehicle.

At step 204, the logic 110 determines from the data received by the antennae 104 whether multiple key fobs have been detected. For example, both parent and child may have entered the vehicle, both of which are carrying his/her associated key fob. If multiple key fobs have been detected at step 204, the logic 110 prompts the driver of the vehicle to enter a unique identifier associated with the key fob via the display device 106 and I/O components of the infotainment system at step 206.

Alternatively, if only a single key fob has been detected, the logic 110 identifies the driver by the unique identifier associated with the key fob at step 208. Once the driver has been identified, the logic 110 searches the storage device 108 for the driver data 114 associated with the unique identifier at step 210. If this is the first time the driver associated with the key fob has driven the vehicle, there may be no data collected and stored in the storage device 108 for this key fob identifier. Thus, if no historical data exists in the storage device 108 for this key fob identifier at step 212, the logic 110 creates a record for the key fob identifier at step 214.

Figure 3:
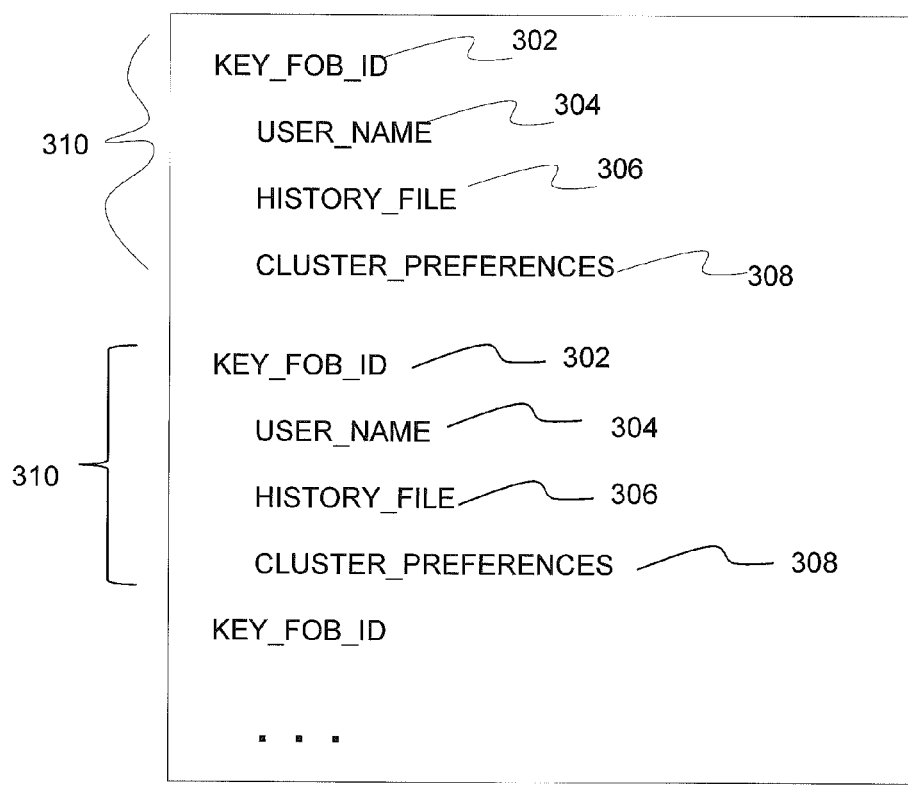
FIG. 3 is a database table used in implementing electric vehicle range projection for multiple drivers of a shared vehicle in accordance with an exemplary embodiment.
Figure 4:
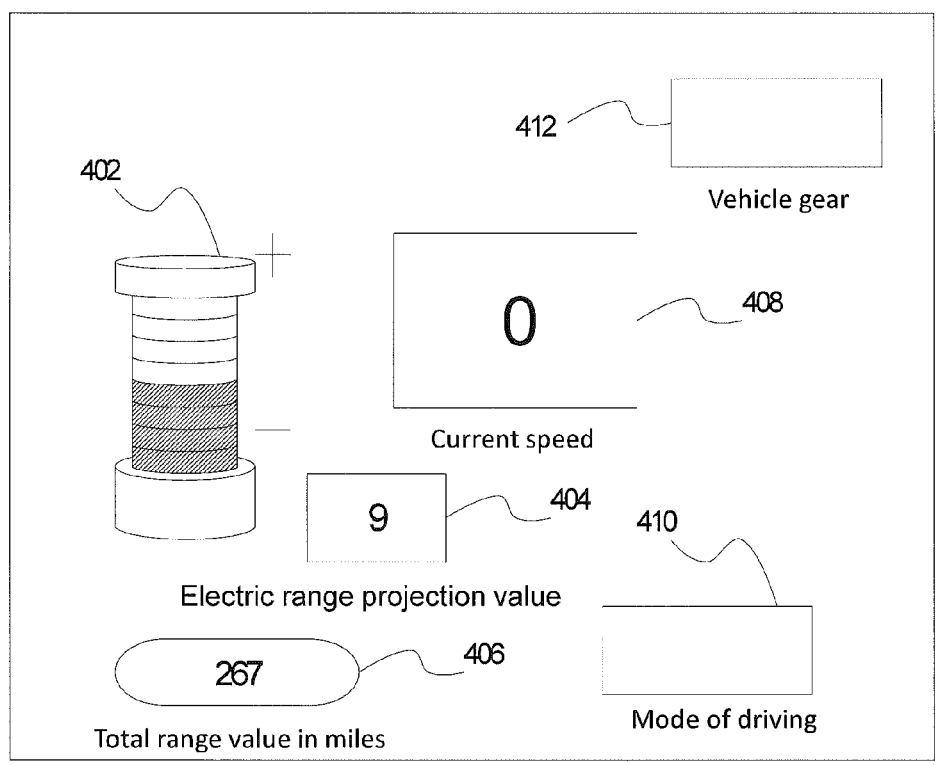
FIG. 4 is an onboard vehicle display of range projection data in an exemplary embodiment.

A sample table 300 of records 310 is shown in FIG. 3. The records 310 include information for each key fob identifier 302, as well as a user name 304, history file 306, and cluster preferences 308. The key fob identifier 302 may be any unique identifier (e.g., an alphanumeric value) assigned to the corresponding key fob. The user name 304 reflects a name of the user associated with a particular key fob. The history file 306 corresponds to the driver data 114 in FIG. 1. Using the cluster preferences 308, the user can switch between configurations that specify where items on the cluster may be displayed. For example, a simple configuration may specify that a battery gauge is to be located on the left side of the cluster (e.g., as shown in FIG. 4) and the fuel gauge is to be displayed on the right side of the cluster. A more advanced configuration may specify that the battery gauge (or fuel gauge if the battery is depleted) is to be displayed on the left side of the cluster and the driver efficiency gauge is to be displayed on the right side of the cluster. As shown in FIG. 4, the view of a customized electric range value specific to the user, as well as other information is provided.

At step 216, the logic 110 calculates and displays a range projection value for the key fob identifier based on data acquired during the current drive cycle, which may be based on calibrations performed on various devices of the vehicle. For example, the logic 110 may receive current charge information from the OBCM of the charging system 116, as well as temperature data from a temperature sensor in the vehicle and terrain information from a combination of sources, such as an accelerator position, rate of change in acceleration or deceleration applied to a current speed, and GPS coordinates indicative of a terrain traversed by the vehicle or routing information stored or entered into a navigation system. The logic 110 may be configured to adjust estimated projection ranges upward or downward based on current temperatures. For example, extreme heat and cold can reduce the average range projection for a given drive cycle. In addition, significant changes in terrain and driving technique can also impact the average range projection for a drive cycle. The range projection value calculated by the logic 110 is displayed on the display device 106 for the driver.

Alternatively, if driver data 114 exists for the key fob identifier at step 212, the logic 110 retrieves the driver data 114 for the key fob identifier at step 218. The logic 110 calculates and displays a current range projection value using the driver data 114 and current information (e.g., current charge available, temperature, driving technique, and terrain) at step 220. For example, as shown in FIG. 4, a vehicle display screen 400 illustrates several elements, such as a graphical depiction of a battery 402 showing a current percentage of remaining charge, an electric range projection value 404 calculated for the driver, and a total range value 406 in miles, which indicates a total distance the driver may travel with remaining battery charge and fuel. As shown in FIG. 4 by way of illustration, the logic 110 calculated the projected electric range value 404 as 9 miles, which means based on current data (e.g., temperature, terrain, driving technique, and current charge available) and driver data 114 (e.g., average speed of driver, average rates of change in acceleration and deceleration, etc.), the driver (e.g., the user of key fob 112A) can expect to drive another 9 electric miles before the battery needs to be recharged. However, suppose a different driver entered the vehicle and is traveling the same route as the first driver. The logic 110 collects different driver data 114 resulting in a different projected electric range value. The projected electric range value for this second driver may be 12 miles, even though the current amount of charge remaining is the same for both drivers, as the driver data 114 reflects this driver's driving style (i.e., average driving speed, average rate of acceleration and deceleration, etc.).

Other information that may be displayed on the vehicle display screen 400 includes a current speed 408 of the vehicle, a mode of driving 410, and vehicle gear 412, to name a few.

Returning to FIG. 2, the logic 110 determines whether the drive cycle has ended at step 222. This may be determined by monitoring the ignition status (e.g., powered on or off) of the vehicle. If the drive cycle has completed, the logic 110 updates the driver data 114 for the record associated with the driver and key fob identifier at step 224. If, however, the drive cycle has not completed at step 222, the logic 110 continues to update or re-calculate the projected electric range value at step 226 using more current drive cycle data (at step 216) or the current drive cycle data and historical drive cycle data (at step 220).

Technical effects include electric vehicle range projection for multiple drivers of a shared vehicle that is customized based on each driver's driving style. A key fob carried by a user is discovered when in range of the vehicle, and an identifier of the key fob is used to access a storage device in the vehicle's memory system to retrieve the driver data associated with that key fob and user. The range projection process applies calculations on the driver data and a current amount of available or remaining energy in the battery pack, as well as other factors, to determine a projected electric range value that is specific to this user and his/her driving style. In an embodiment, the range projection calculation may be repeated during a driving event and updated to reflect current vehicle usage.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. A system, comprising:
    a computer processor;
    an antenna;
    a data bus communicatively coupling the antenna to the computer processor within a vehicle; and
    logic executable by the computer processor, the logic configured to implement a method, the method comprising:
    detecting, via the antenna, a key fob within range of the vehicle, the key fob associated with an individual;
    searching a database for a record having an identifier that matches an identifier of the key fob, the record storing historical drive cycle data associated with the key fob and the individual;
    retrieving the historical drive cycle data;
    calculating a projected electric range value indicative of a distance in which the vehicle is capable of traveling on electric-only power, the projected electric range value calculated as a function of a distance calculated based on remaining battery charge and adjusted based on a driving style of the individual, the driving style of the individual determined from the historical drive cycle data; and
    transmitting the projected electric range value over the data bus to a device in the vehicle, and presenting the projected electric range value via the device.

2. The system of claim 1, wherein the logic is further configured to implement:
    recalculating the projected electric range value periodically throughout a duration of a drive cycle; and
    presenting a recalculated projected electric range value via the device.

3. The system of claim 1, wherein the logic is further configured to implement:
    detecting another key fob within range of the vehicle, the other key fob associated with another individual; and
    prompting a driver of the vehicle, via a display device, to enter an identifier of the key fob associated with the driver, the driver representing one of the individual and the other individual;
    wherein the identifier entered by the driver is used to perform the searching.

4. The system of claim 1, wherein the historical drive cycle data includes:
    average electrical energy consumption rate;
    average speed;
    average rate of acceleration; and
    average rate of deceleration.

5. The system of claim 1, wherein the projected electric range value is further adjusted based on current temperature.

6. The system of claim 1, wherein the projected electric range value is further adjusted based on terrain information derived from at least one of a navigation system of the vehicle and accelerator data.

7. The system of claim 1, wherein the device is at least one of:
    a display device of an infotainment system in the vehicle;
    an audio device of an infotainment system in the vehicle; and
    an instrument panel cluster in the vehicle.

8. A method, comprising:
    detecting, via an antenna embedded in a vehicle, a key fob within range of the vehicle, the key fob associated with an individual;
    searching, via a computer processor embedded in the vehicle, a database for a record having an identifier that matches an identifier of the key fob, the record storing historical drive cycle data associated with the key fob and the individual;
    retrieving the historical drive cycle data;
    calculating a projected electric range value indicative of a distance in which the vehicle is capable of traveling on electric-only power, the projected electric range value calculated as a function of a distance calculated based on available battery charge and adjusted based on a driving style of the individual, the driving style of the individual determined from the historical drive cycle data; and
    transmitting the projected electric range value over a data bus to a device in the vehicle, and presenting the projected electric range value via the device.

9. The method of claim 8, further comprising:
    recalculating the projected electric range value periodically throughout a duration of a drive cycle; and
    presenting a recalculated projected electric range value via the device.

10. The method of claim 8, further comprising:
    detecting another key fob within range of the vehicle, the other key fob associated with another individual; and
    prompting a driver of the vehicle, via a display device, to enter an identifier of the key fob associated with the driver, the driver representing one of the individual and the other individual;
    wherein the identifier entered by the driver is used to perform the searching.

11. The method of claim 8, wherein the historical drive cycle data includes:
    average electrical energy consumption rate;
    average speed;
    average rate of acceleration; and
    average rate of deceleration.

12. The method of claim 8, wherein the projected electric range value is further adjusted based on current temperature.

13. The method of claim 8, wherein the projected electric range value is further adjusted based on terrain information derived from at least one of a navigation system of the vehicle and accelerator data.

14. The method of claim 8, wherein the device is at least one of:
    a display device of an infotainment system in the vehicle;
    an audio device of an infotainment system in the vehicle; and
    an instrument panel cluster in the vehicle.

15. A computer program product comprising a computer readable storage medium having instructions embodied thereon, which when executed by a computer processor, causes the computer processor to implement a method, the method including:

detecting, via an antenna embedded in a vehicle, a key fob within range of the vehicle, the key fob associated with an individual;

searching a database stored in a vehicle for a record having an identifier that matches an identifier of the key fob, the record storing historical drive cycle data associated with the key fob and the individual;

retrieving the historical drive cycle data;

calculating a projected electric range value indicative of a distance in which the vehicle is capable of traveling on electric-only power, the projected electric range value calculated as a function of a distance calculated based on available battery charge and adjusted based on a driving style of the individual, the driving style of the individual determined from the historical drive cycle data; and transmitting the projected electric range value over the data bus to a device in the vehicle, presenting the projected electric range value via the device.

16. The computer program product of claim 15, wherein the method further includes:

recalculating the projected electric range value periodically throughout a duration of a drive cycle; and presenting a recalculated projected electric range value via the device.

17. The computer program product of claim 15, wherein the method further includes:

detecting another key fob within range of the vehicle, the other key fob associated with another individual; and prompting a driver of the vehicle, via a display device, to enter an identifier of the key fob associated with the driver, the driver representing one of the individual and the other individual;

wherein the identifier entered by the driver is used to perform the searching.

18. The computer program product of claim 15, wherein the historical drive cycle data includes:

average electrical energy consumption rate average speed;

average rate of acceleration; and average rate of deceleration.

19. The computer program product of claim 15, wherein the projected electric range value is further adjusted based on current temperature.

20. The computer program product of claim 15, wherein the projected electric range value is further adjusted based on terrain information derived from at least one of a navigation system of the vehicle and accelerator data.

* * * * *